(12) United States Patent
Binford

(10) Patent No.: US 8,087,869 B1
(45) Date of Patent: Jan. 3, 2012

(54) METHOD AND APPARATUS FOR LOADING PALLETIZED ARTICLES FOR BLAST FREEZING

(76) Inventor: Wallace R. Binford, New Orleans, LA (US)

( * ) Notice: Subject to any disclaimer, the term of this patent is extended or adjusted under 35 U.S.C. 154(b) by 320 days.

(21) Appl. No.: 12/405,512

(22) Filed: Mar. 17, 2009

Related U.S. Application Data

(60) Provisional application No. 61/037,459, filed on Mar. 18, 2008.

(51) Int. Cl.
*B65H 1/00* (2006.01)
(52) U.S. Cl. .................................... 414/806; 414/789.5
(58) Field of Classification Search .................. 414/806, 414/789.5
See application file for complete search history.

(56) References Cited

U.S. PATENT DOCUMENTS

| | | | | |
|---|---|---|---|---|
| 4,439,097 A * | 3/1984 | Mebus | ........................ | 414/789.5 |
| 5,048,811 A * | 9/1991 | Hochbein | ........................ | 271/5 |
| 5,174,712 A * | 12/1992 | Focke et al. | ................ | 414/796.5 |
| 5,269,645 A * | 12/1993 | Winski | ........................ | 156/182 |
| 5,336,042 A * | 8/1994 | Winski et al. | ............... | 414/789.5 |
| 6,431,817 B1 * | 8/2002 | Simkowski | ................ | 414/796.9 |
| 6,796,142 B2 * | 9/2004 | Burn | ........................ | 62/380 |
| 2003/0156926 A1 * | 8/2003 | Coblentz | .................... | 414/142.7 |

* cited by examiner

*Primary Examiner* — Saul Rodriguez
*Assistant Examiner* — Stephen Vu
(74) *Attorney, Agent, or Firm* — Garvey, Smith, Nehrbass & North, L.L.C.; Brett A. North

(57) ABSTRACT

A method and apparatus for spacing apart layers of cartons containing animal parts (such as chicken parts). In one embodiment is provided a vacuum assist lift device to transfer layers of cartons from a packed condition to a palletized spaced apart condition. In one embodiment is provided a method of simultaneously transferring a plurality of layers from a packed condition to a spaced apart condition. In one embodiment is provided a vacuum assist lift device which can be adjusted for a plurality of configurations of layers of cartons.

16 Claims, 14 Drawing Sheets

METHOD AND APPARATUS FOR LOADING PALLETIZED ARTICLES FOR BLAST FREEZING

CROSS-REFERENCE TO RELATED APPLICATIONS

Priority of U.S. Provisional Patent Application Ser. No. 61/037,459, filed Mar. 18, 2008, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND

In one embodiment is provided a method and apparatus for preparing palletized articles for blast freezing. More particularly, in one embodiment is provided an improved method and apparatus for preparing for blast freezing palletized layers of cartons containing animal parts (such as chicken parts), wherein air flow dividers are placed in between the layers of palletized cartons, each layer being lifted (multiple cartons at a time) using a vacuum assisted lift and then stacked on a new pallet enabling air circulation dividers to be placed between the layers.

In the shipping of food articles, it is common to place those articles in cartons. For example, chicken parts can be placed in a carton that is to be frozen for shipment. Each of those cartons is then placed in a layer upon a pallet. For example, a pallet can include a first layer of five, six or seven cartons of food (for example, chicken parts) and a second layer of the same number of cartons is then placed upon the first layer. After several layers have been placed on the pallet, the entire cargo can then be covered and wrapped with plastic film or other wrap to prevent tipping or shifting of the load.

When these palletized cargo packages of multiple layers of cartons of food arrive at a transfer station, it is often desirable to blast freeze the articles before they are placed in a different shipping vehicle such as a marine vessel.

In order to insure complete freezing of the animal parts (such as chicken parts) in each of the cartons, it is known in the art to place an air circulation divider or panel in between each layer of cartons.

At the present time, the placement of air circulation dividers or panels in between the layers is a manual process. Manually placing air circulation dividers between layers is a very labor intensive process, requiring each carton to be manually removed from its original pallet. These same cartons must then be re-stacked one layer at a time on a new pallet and wherein each layer is separated from another layer with an air circulation divider or panel.

It is desirable to provide a method and apparatus wherein entire layers of cartons can be picked up at a single point in time and placed on an air circulation divider.

It is also desirable that the entire weight of the layer of cartons being moved on to an air circulation divider not be fully supported by the individual(s) moving the layer.

It is also desirable that multiple layers of cartons be capable of being simultaneously moved onto air circulation dividers.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

BRIEF SUMMARY

In one embodiment is provided an improved method of preparing for blast freezing palletized stacks of cartons containing animal parts (such as chicken parts).

In one embodiment a first pallet of stacked cartons containing animal parts to be frozen by blast freezing is provided, the first pallet of cartons including multiple layers, each layer having multiple cartons of animal parts (such as chicken parts). A second pallet (typically empty) is provided.

In one embodiment layers of cartons can be lifted from the first pallet, one layer at a time. A vacuum assisted lift can pick up multiple cartons in a layer at a time, preferably an entire layer. This layer can then be transferred to the second pallet, which is preferably empty.

In one embodiment the second pallet (transfer pallet) then begins a new palletized load ready to be blast frozen. In one embodiment, as each layer is added to the second pallet using the vacuum assist lift, an air circulation panel or air circulating divider can be placed upon that added layer. As each layer is added to the second pallet, an air circulating layer is thus provided in between any two layers of cartons. A second palletized load (transfer pallet) can thus be completed by sequentially transferring each layer of multiple articles or multiple cartons from the first pallet to the second pallet.

In one embodiment is provided a method and apparatus for spacing apart layers of cartons containing animal parts (such as chicken parts).

In one embodiment is provided a vacuum assist lift device to transfer layers of cartons from a packed condition to a palletized spaced apart condition.

In one embodiment is provided a method of simultaneously transferring a plurality of layers from a packed condition to a spaced apart condition.

In one embodiment is provided a vacuum assist lift device which can be adjusted for a plurality of configurations of layers of cartons.

The drawings constitute a part of this specification and include exemplary embodiments.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION

Figure 13:
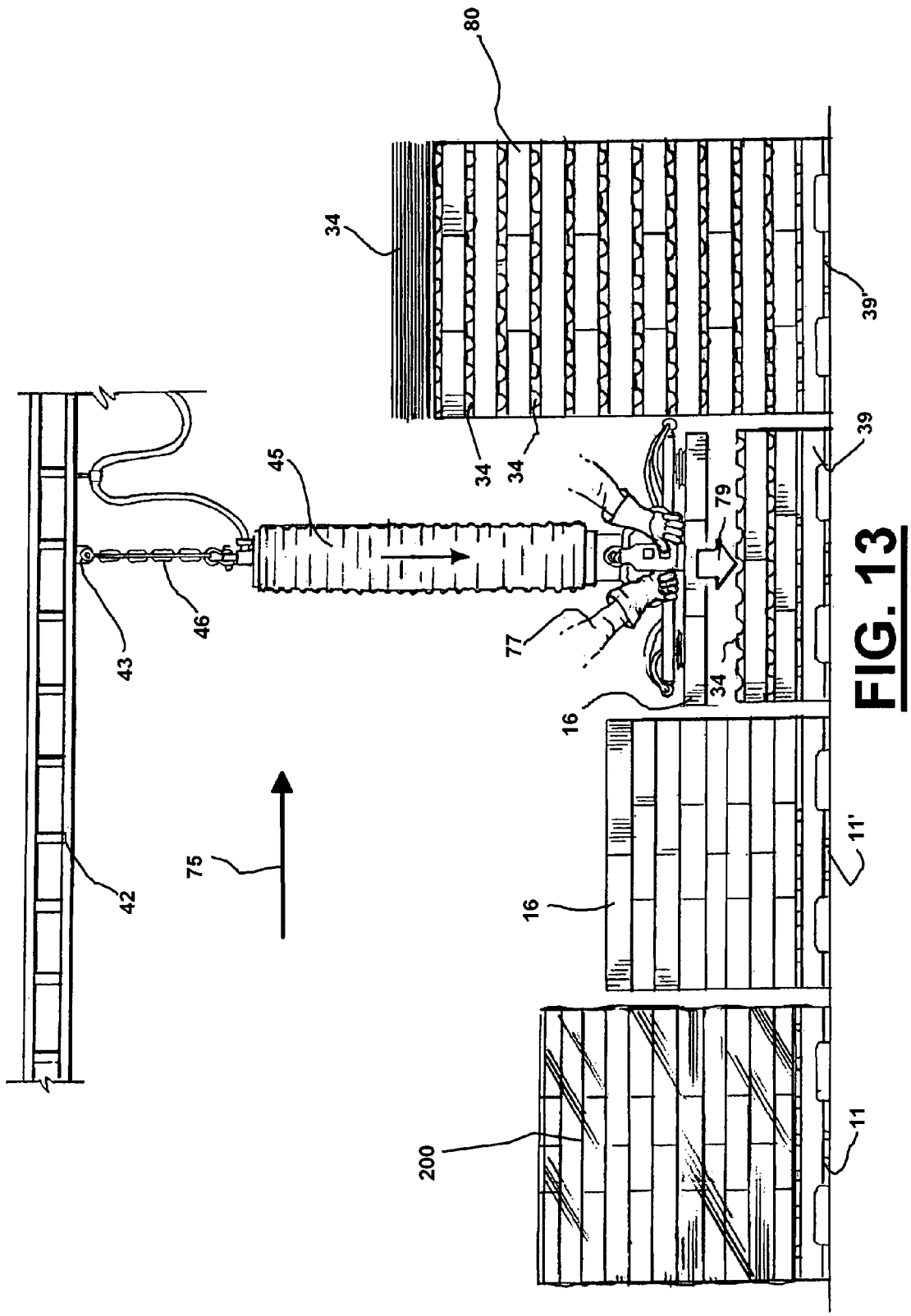
FIG. 13 is a fragmentary side view showing a layer of cartons being placed on the second pallet.
Figure 14:
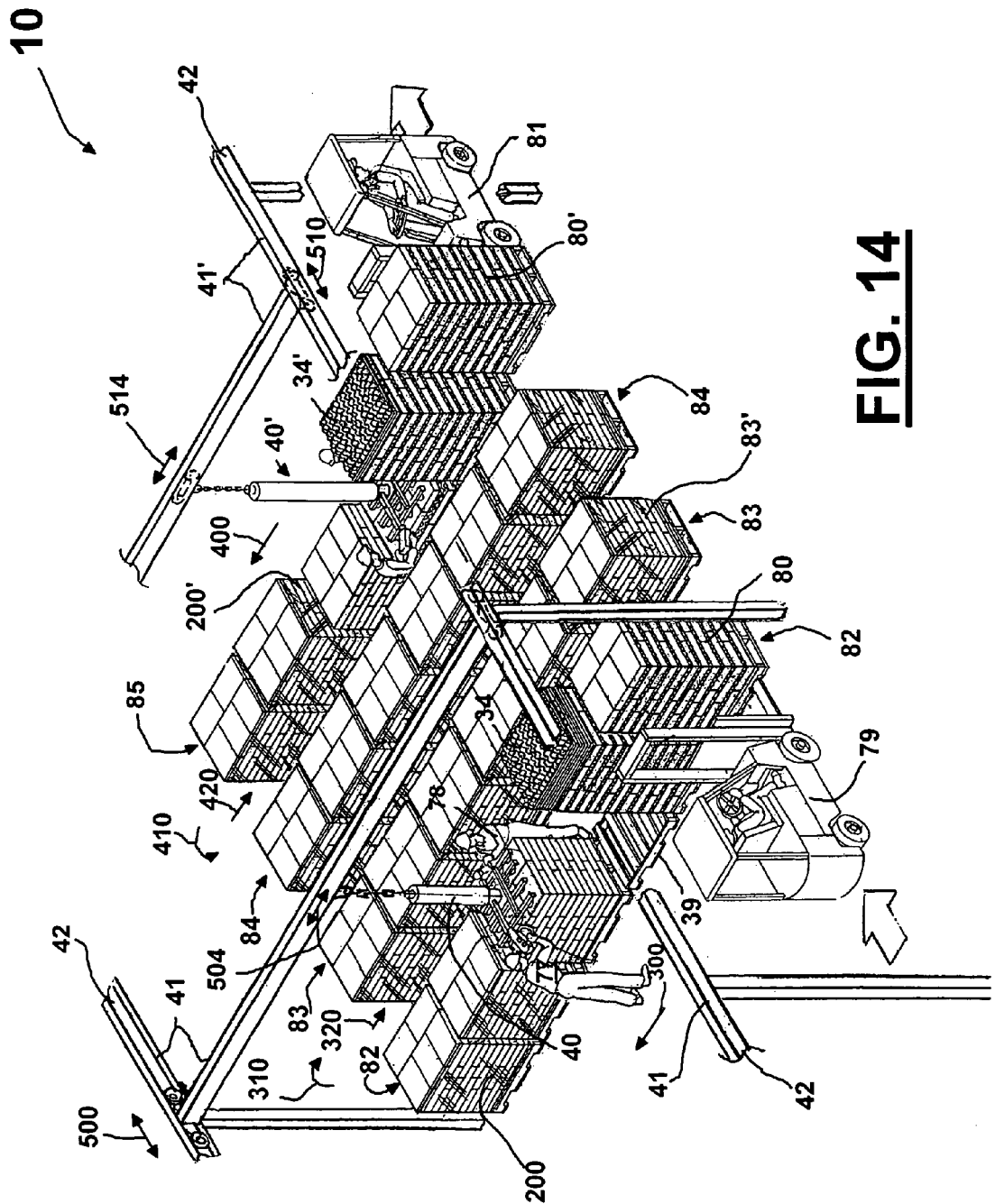
FIG. 14 is an overall perspective view showing a plurality of vacuum assisted lift apparatuses simultaneously transferring layers of cartons from different pallets to new sets of pallets.

FIGS. 1-20 show one embodiment of the method and apparatus, designated generally by the numeral 10 in FIG. 14 and called a method and apparatus for blast freezing cartons of animal parts (such as chicken parts).

Blast freezing system 10 can provide a stacked pallet 11, or stacked palletized load 11 that includes a first pallet 12 having forklift sockets 13, 14 (along with sockets 13', 14' making pallet 12 a "four way" pallet). In "four way" pallets a lift truck or fork lift can pick up the pallet and its load from any of the pallet's four sides. However, some pallets only include sockets 13' and 14' (i.e., sockets 13 are 14 omitted)—this type of pallet is called "two way" because it can only be picked up by a lift truck or fork lift from one of two directions.

Figure 1:
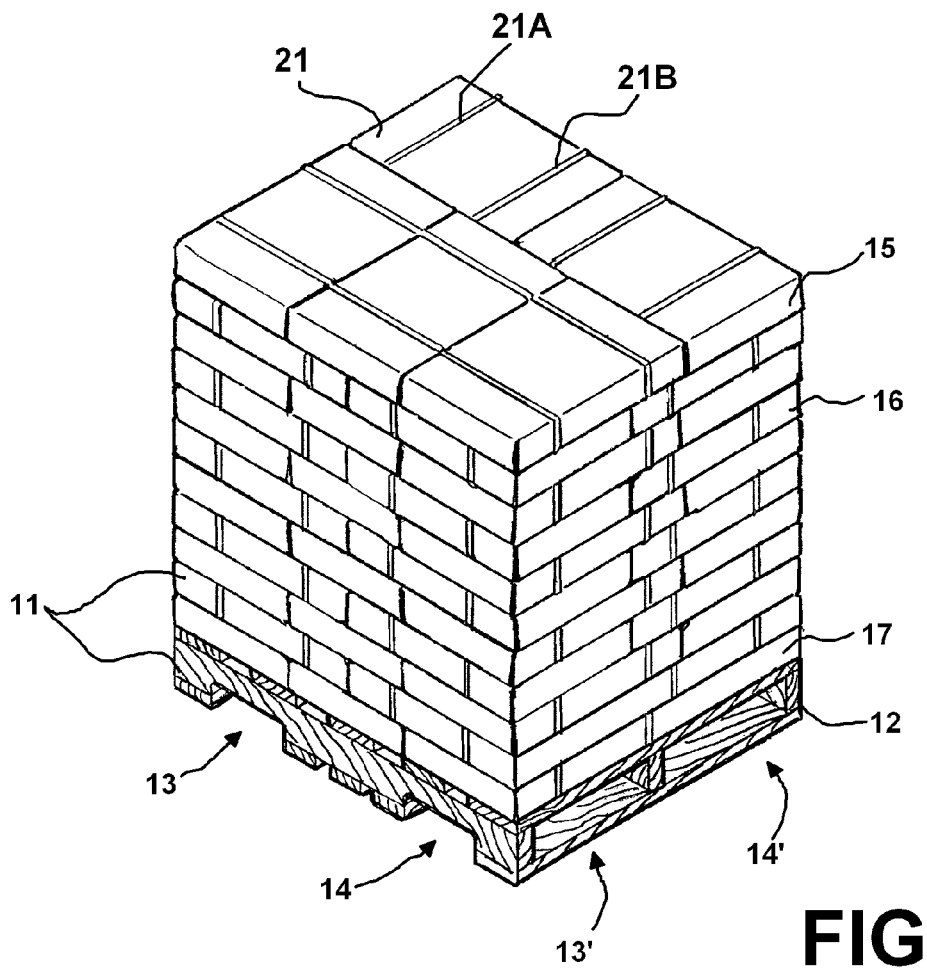
FIG. 1 is a perspective view showing a typical palletized load that includes a pallet having multiple layers of articles or cartons with five cartons per layer.

A number of layers of food cartons can be placed upon pallet 12 including an upper layer of food cartons 15 (where the food cartons include animal parts which can be used as food such as frozen chicken parts). The layers include multiple middle layers of food cartons 16 and a lower layer of food cartons 17. Each layer 15, 16 or 17 of food cartons in FIGS. 1-2 can include five food cartons 18, 19, 20, 21, 22. Each carton can include a plurality of closure strips to prevent the cartons from opening. For example, in FIG. 1 closure strips 21A and 21B are identified for carton 21. In FIG. 1 eleven layers of food cartons are shown (the number of layers of cartons can vary depending on the customer, size of cartons and weight of cartons).

Figure 3:
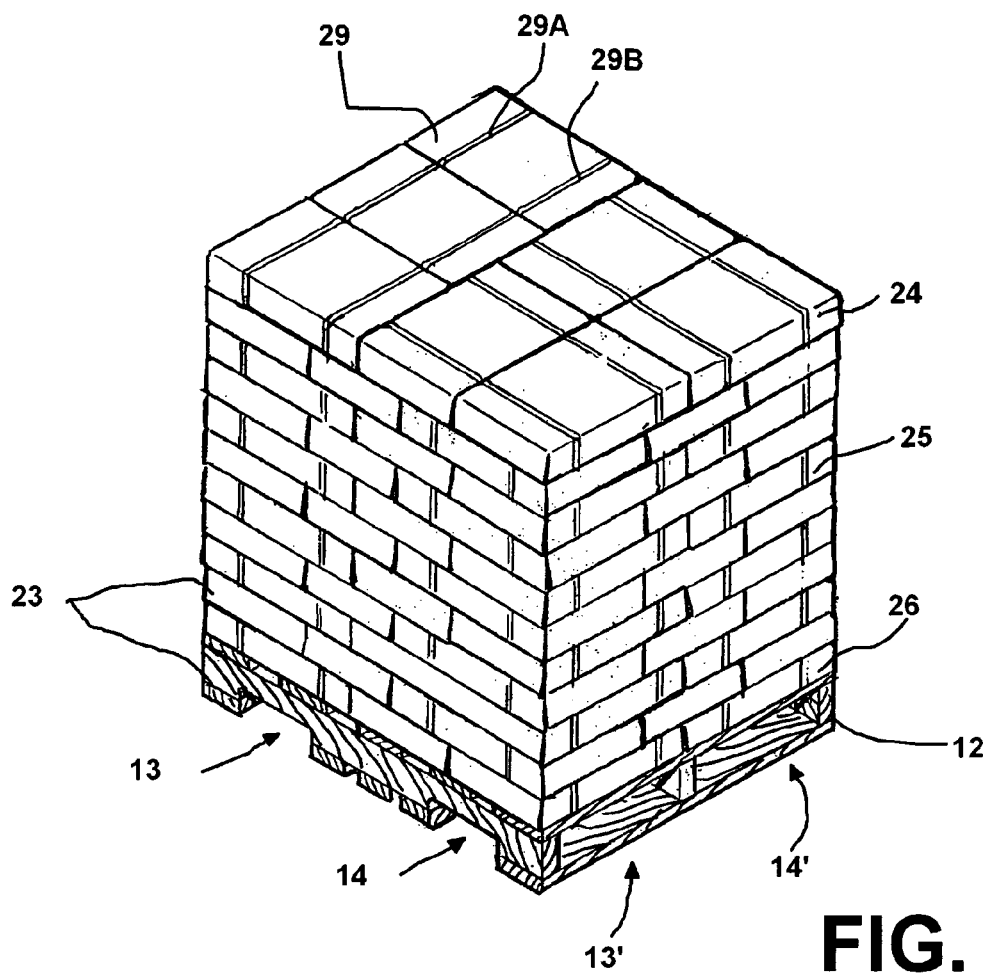
FIG. 3 is a perspective view showing a typical palletized load that includes a pallet having multiple layers of articles or cartons with seven cartons per layer.
Figure 4:
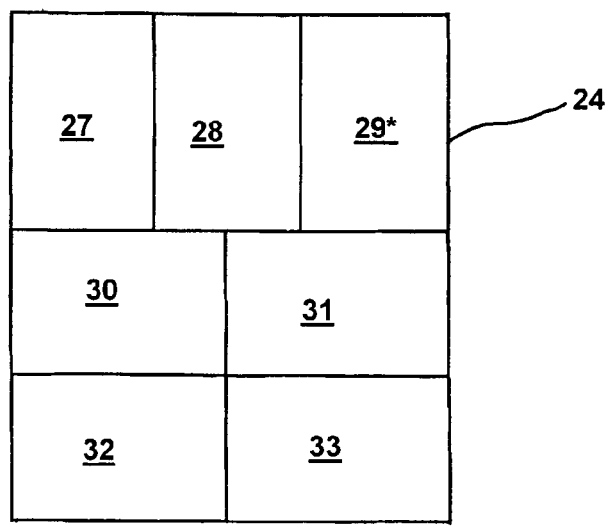
FIG. 4 is a schematic top view of the palletized load of FIG. 3.

The layer 24 of food cartons in FIGS. 3-4 can include seven cartons such as the food cartons 27, 28, 29, 30, 31, 32, 33 of FIG. 4. In FIG. 3, the stacked pallet 23 provides an upper layer of cartons 24 that include seven cartons (the number of layers of cartons can vary depending on the customer, size of cartons, and weight of cartons), a lower layer of food cartons 26 that include seven cartons 27-33 and multiple middle layers of food cartons 25, each of which includes seven food cartons 27-33. In FIG. 3 closure strips 29A and 29B are identified for carton 29. In FIG. 3 eleven layers of food cartons are shown.

Figure 5:
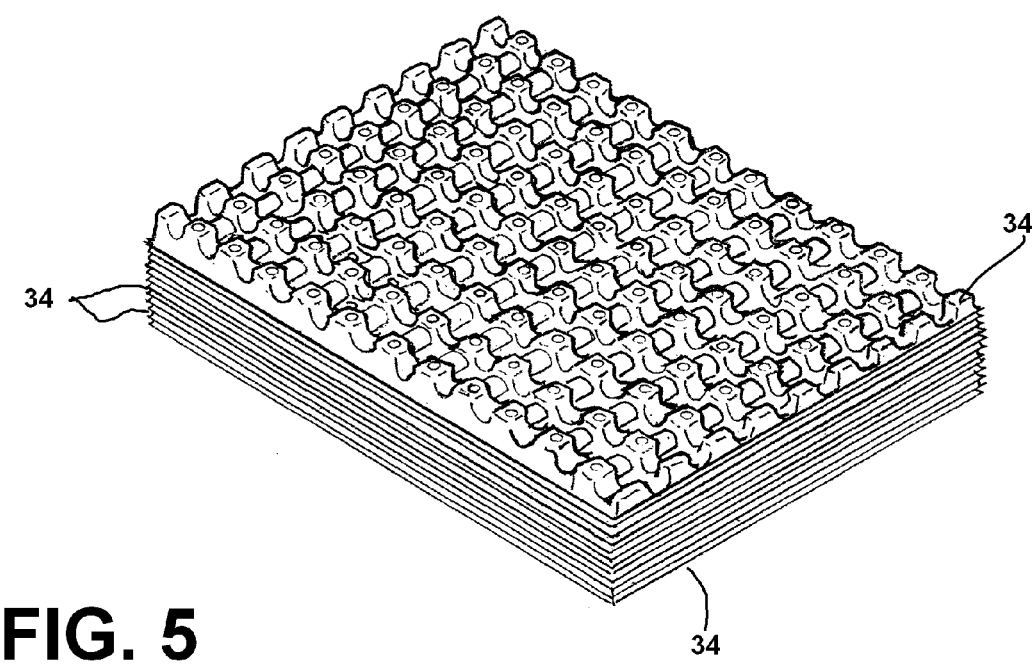
FIG. 5 is a perspective view illustrating a stack of air circulation dividers which are prior art, known and commercially available.
Figure 6:
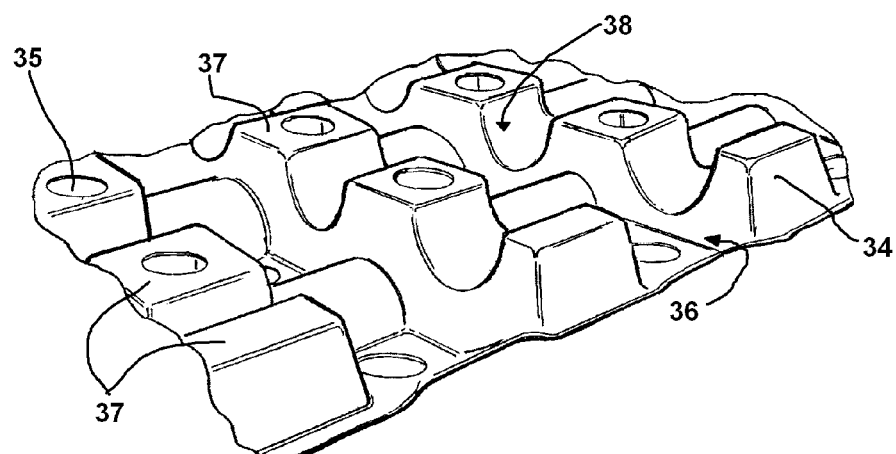
FIG. 6 is a fragmentary view of an air circulation divider.
Figure 7:
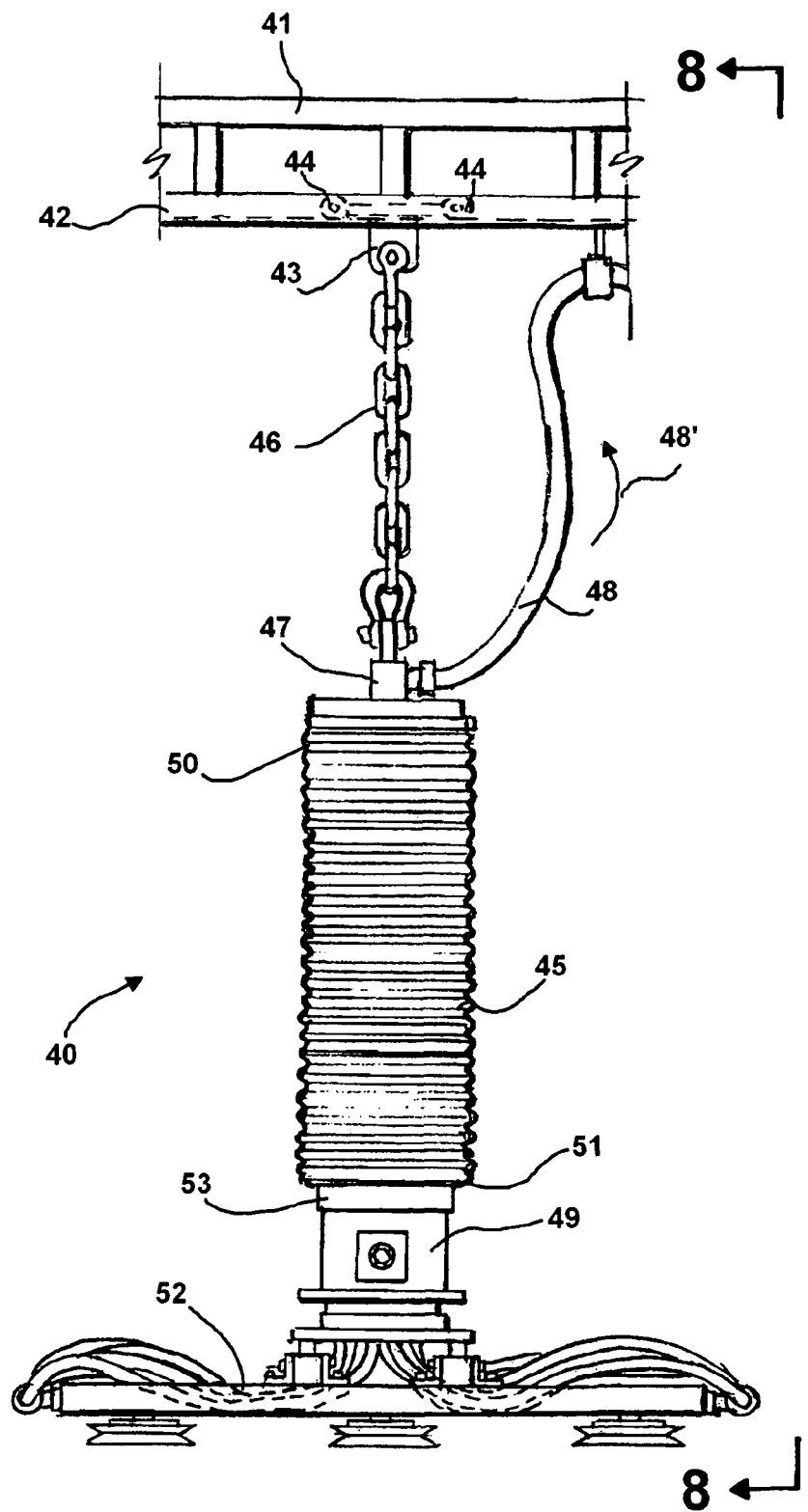
FIG. 7 is a fragmentary front elevation view of an vacuum assisted lift apparatus.
Figure 8:
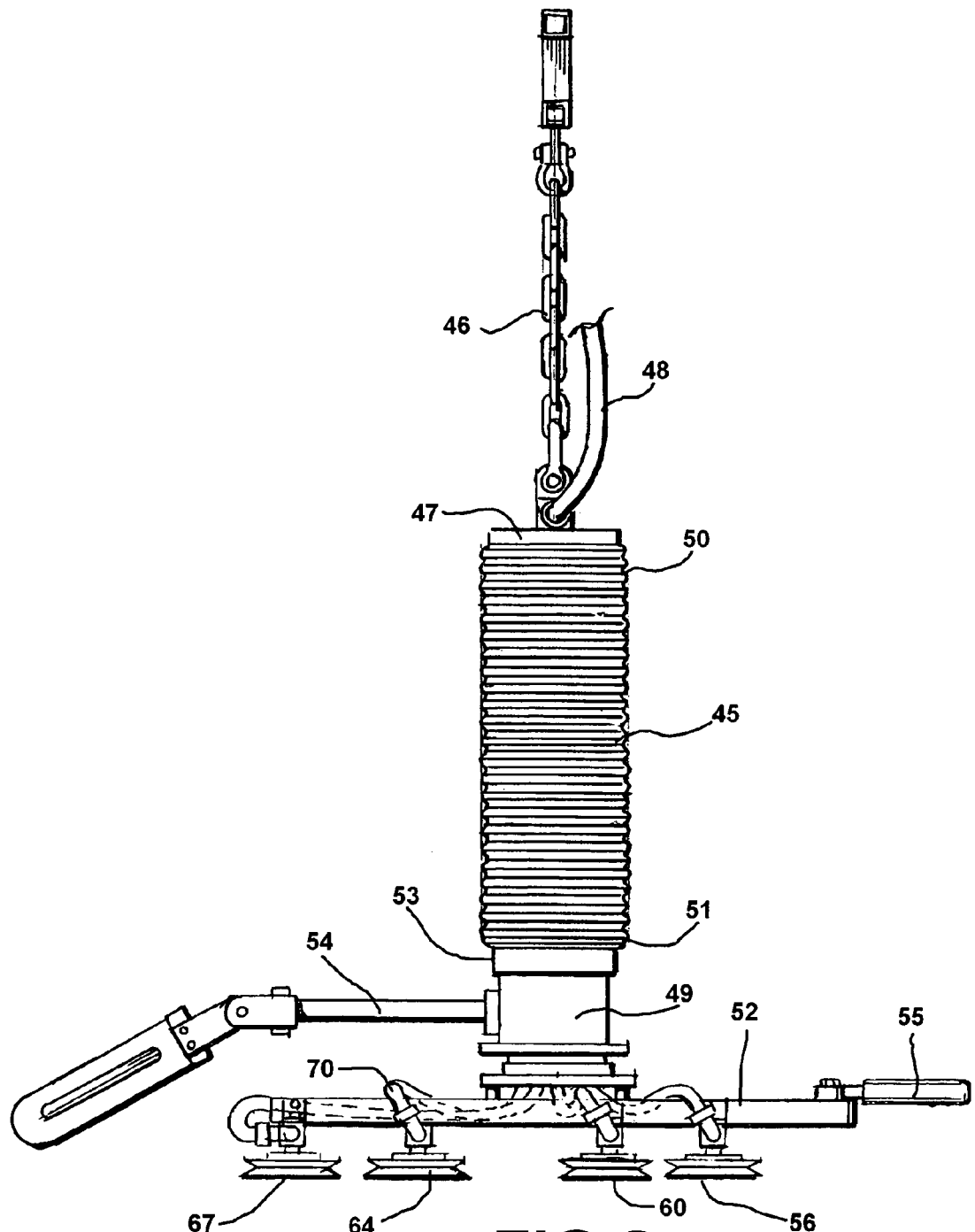
FIG. 8 is a fragmentary side elevation view of the vacuum assisted lift apparatus of FIG. 7.

In one embodiment, air circulating dividers 34 (spacers) can be placed in between each layer of food cartons for either of the stacked pallets 11 or 23. A commercially available air circulating divider 34 is shown in FIGS. 5 and 6. Such an air circulating divider 34 spaces apart layers above and below the divider and provides multiple openings 35 therethrough and multiple channels 36. The channels 36 can be generally in between projections 37. Instead of channels, the air circulation divider 34 can also provide depressions 38. The purpose of air circulation dividers or spacers is to allow cold air flow (such as from a blast freezer) to travel in between the plurality of layers of cartons in a palletized stack thereby allowing the cold air to contact both the upper and lower surface of each carton in the layers and decreasing the amount of time required to freeze animal parts in the cartons compared to a stack of cartons in which the layers are not spaced apart.

If the layers of palletized cartons are not spaced apart, the cold air from a blast freezer would only contact the uppermost surface of the cartons on the top layer, along with the lowermost surface of the cartons on the bottom layers, and the exposed outer side surfaces of the cartons in the palletized stack (the exposed surfaces for non-spaced apart cartons can be viewed in FIGS. 1 and 3). However, the blast freezing facility typically receives (from the animal part processing plant) palletized stacks of cartons which have not been spaced apart—similar to those palletized stacks shown in FIGS. 1 and 3. In some instances, however, spaced apart stacks are received which can be placed immediately in the blast freezer, and do not require the step of spacing apart the layers of cartons.

To substantially shorten the freezing time in the blast freezer these layers of cartons should be spaced apart. However, prior art techniques to space apart the layers typically include individually removing each carton from a first layer of a first palletized stack of cartons, and then manually stacking such carton in a layer on a spacer 34, and then placing another spacer on such manually stacked layer, and begin the manual unstacking and restacking process until the second pallet becomes a palletized stack of spaced apart layers. This manual unstacking and restacking process is slow, difficult, and dangerous for the persons performing the manual unstacking and restacking. The cartons of animal parts are heavy and can cause injury to the persons performing the manual process. Additionally, when individually moved, there is an increased risk that individual cartons will "break open" with the animal parts falling out, requiring such carton and its contents to be thrown away as damaged.

In one embodiment is provided a method and apparatus 10 to move an entire layer at one time from a first pallet to a second pallet so that the second pallet can be spaced apart by spacers for blast freezing. In order to remove a layer 15, 16, 17 or 24, 25, 26 from a stacked pallet 11 or 23, a vacuum assist lifting device 40 can be provided as shown in FIGS. 7-13. Vacuum assist lifting device 40 can be supported by an elevated frame or superstructure 41 that includes multiple rails 42. The vacuum assist lifting device 40 travels upon a rail or rails 42, supported by a moving (e.g. rolling) carriage 43. The carriage 43 preferably provides multiple rollers 44. A tensile member 46 extends between carriage 43 and fitting 47. The tensile member 46 can be a cable, rope, chain, sling or the like.

A vacuum source 48 is connected to vacuum assist lifting device 40 at fitting 47. Vacuum source 48 can be connected to a vacuum device which creates a partial vacuum such as a powered blower pulling air in the direction of arrow 48'. Vacuum assist lifting device 40 can include a bellows 45. Bellows 45 connects at its upper end 50 to fitting 47. Bellows 45 connects at its lower end 51 to control section 49.

Control section 49 can includes a frame 52, fitting 53, primary control handle 54, and can include secondary control handle 55. In FIGS. 8-13, frame 52 can include center support bars 150, along with a plurality of adjustable suction bars 152, 154, 156, and 158. The support bars can supports a plurality of suction cups 56-69.

Multiple suction cups are provided including the suction cups 56-69. Each of the suction cups 56-69 is provided with vacuum by means of a vacuum line 70. There is a vacuum line 70 that connects each of the suction cups 56-69 to fitting 53 and thus bellows 45. The suction cups 56-69 can be adjustably connected to frame 52. In this fashion, the position of each of the suction cups 56-69 can be adjusted depending upon the arrangement of cartons of food 18-22 or 27-33 that make up a particular layer 15 or 24 for example.

Figure 2:
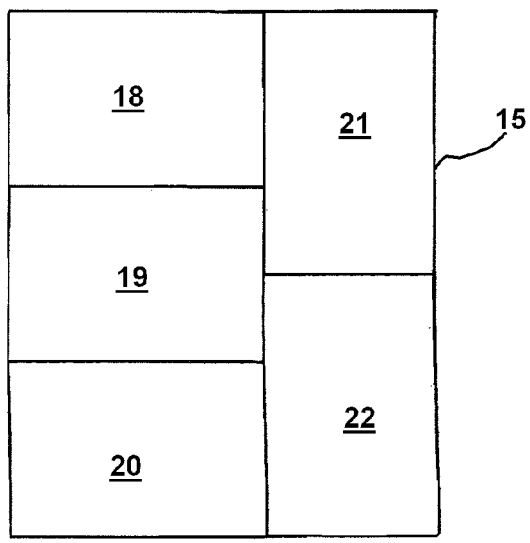
FIG. 2 is a schematic top view of the palletized load of FIG. 1.
Figure 9:
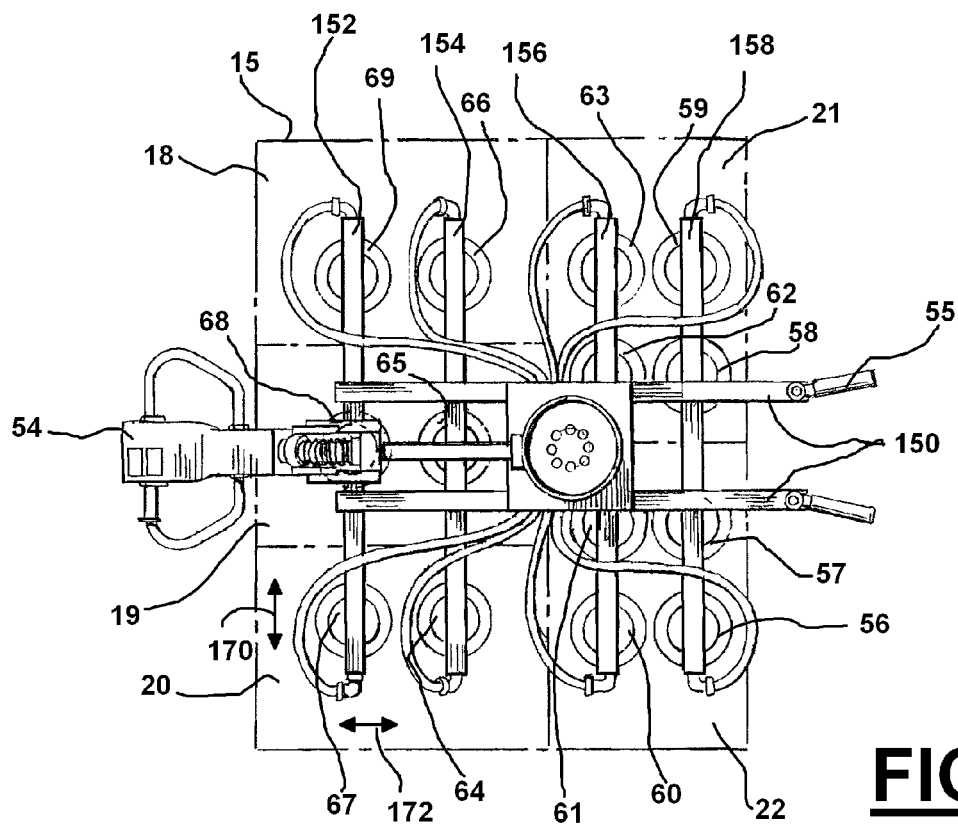
FIG. 9 is a top view of the vacuum assisted lift apparatus of FIG. 7 shown in the process of lifting a layer of five cartons.
Figure 10:
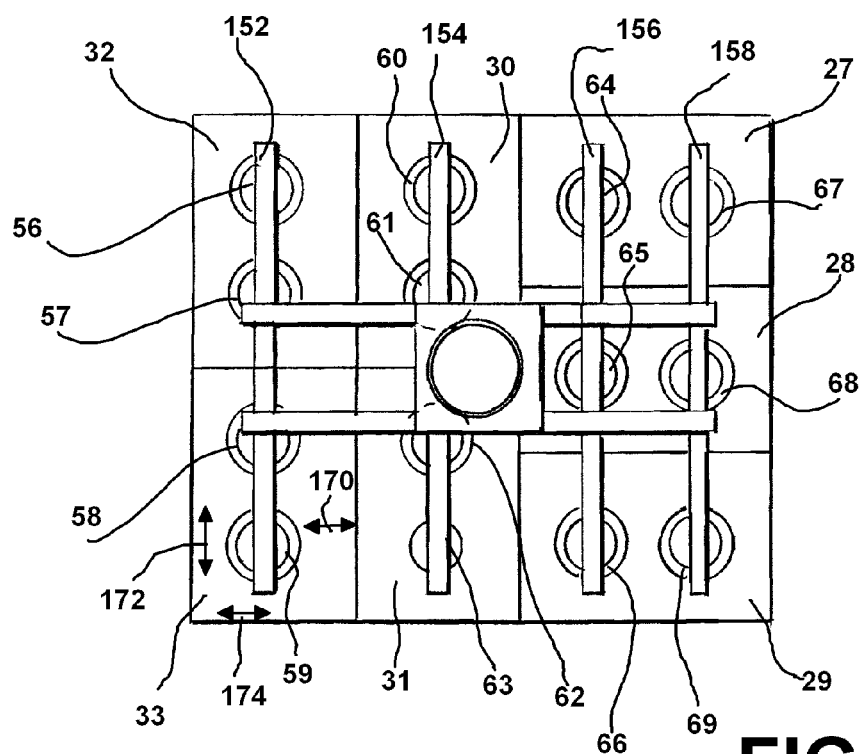
FIG. 10 is a top view of the vacuum assisted lift apparatus of FIG. 7 shown in the process of lifting a layer of seven cartons.

In FIG. 9, the suction cups 56-69 have been positioned to lift a layer of cartons 15 that include five cartons 18-22 as shown in FIG. 2. In FIG. 10, the suction cups 56-69 have been arranged to pick up a layer 24 that includes the seven food cartons 27-33 of FIG. 4. One or more of the adjustable support bars can be adjustable relative to center support bars 150. For example, arrows 170 schematically indicates that support bar 152 can be adjusted in either direction relative to center support 150. Similarly the other support bars 154, 156, and 158 can be adjustable relative to center support. Additionally, one or more of the suction cups 56-69 can be adjustable relative to the support bar to which the specific suction cup is attached. For example, arrows 172 schematically indicates that suction cup 59 can be adjusted in either direction relative to support bar 152. Similarly, other suction cups 60-69 can be adjustable relative to the support bar to which the suction cup is so attached. In this way the position of all suction cups 59-69 can be adjusted to a position desired by the operator to ensure picking up each carton in a layer of cartons. FIG. 9 shows adjustment positions of suction cups 59-69 to pick up a layer of five cartons. FIG. 10 shows adjustment positions of suction cups 59-69 to pick up a layer of seven cartons.

Figure 11:
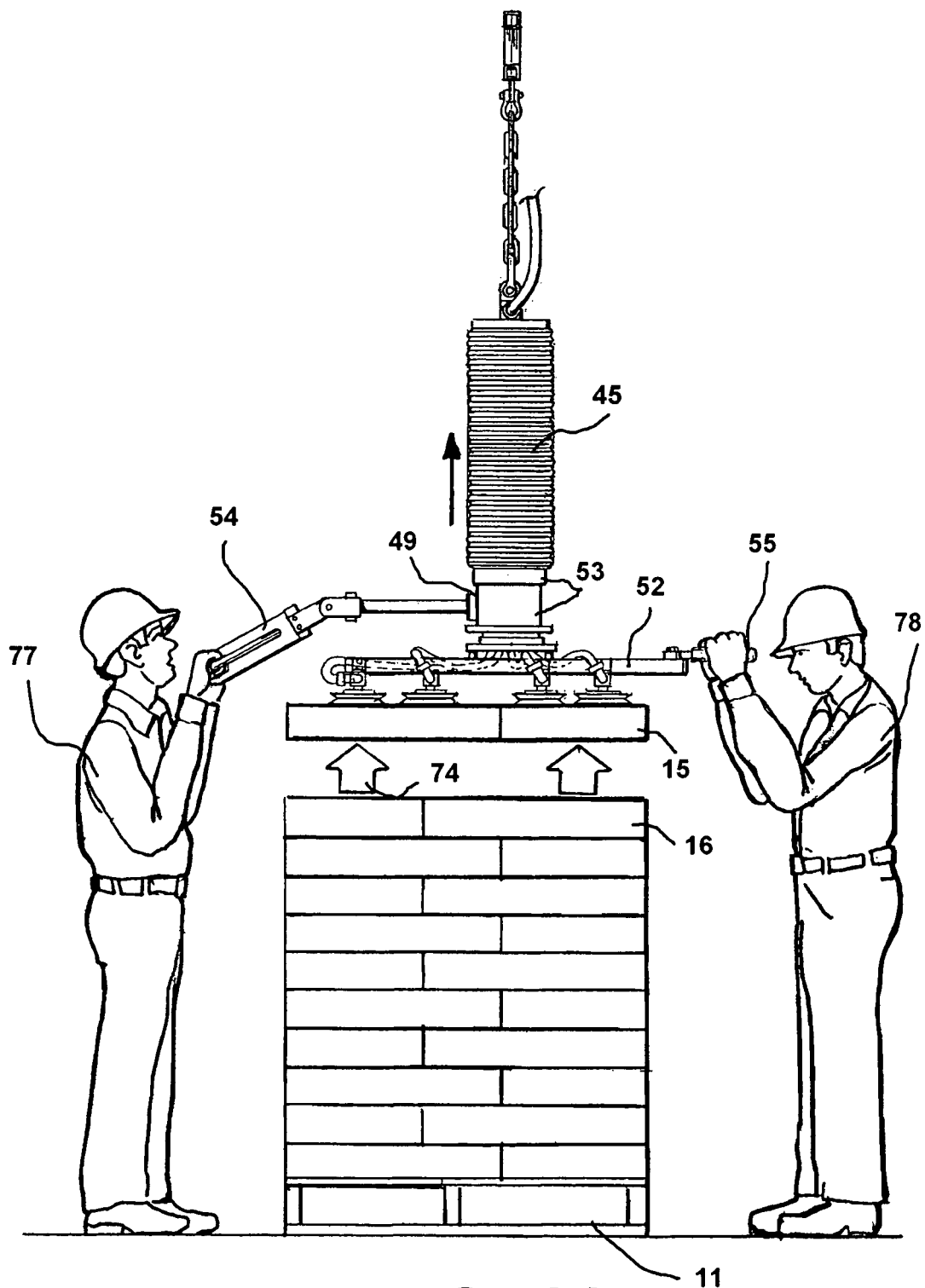
FIG. 11 is a fragmentary side view showing a layer of cartons being lifted by the vacuum assisted lift apparatus of FIG. 7.
Figure 12:
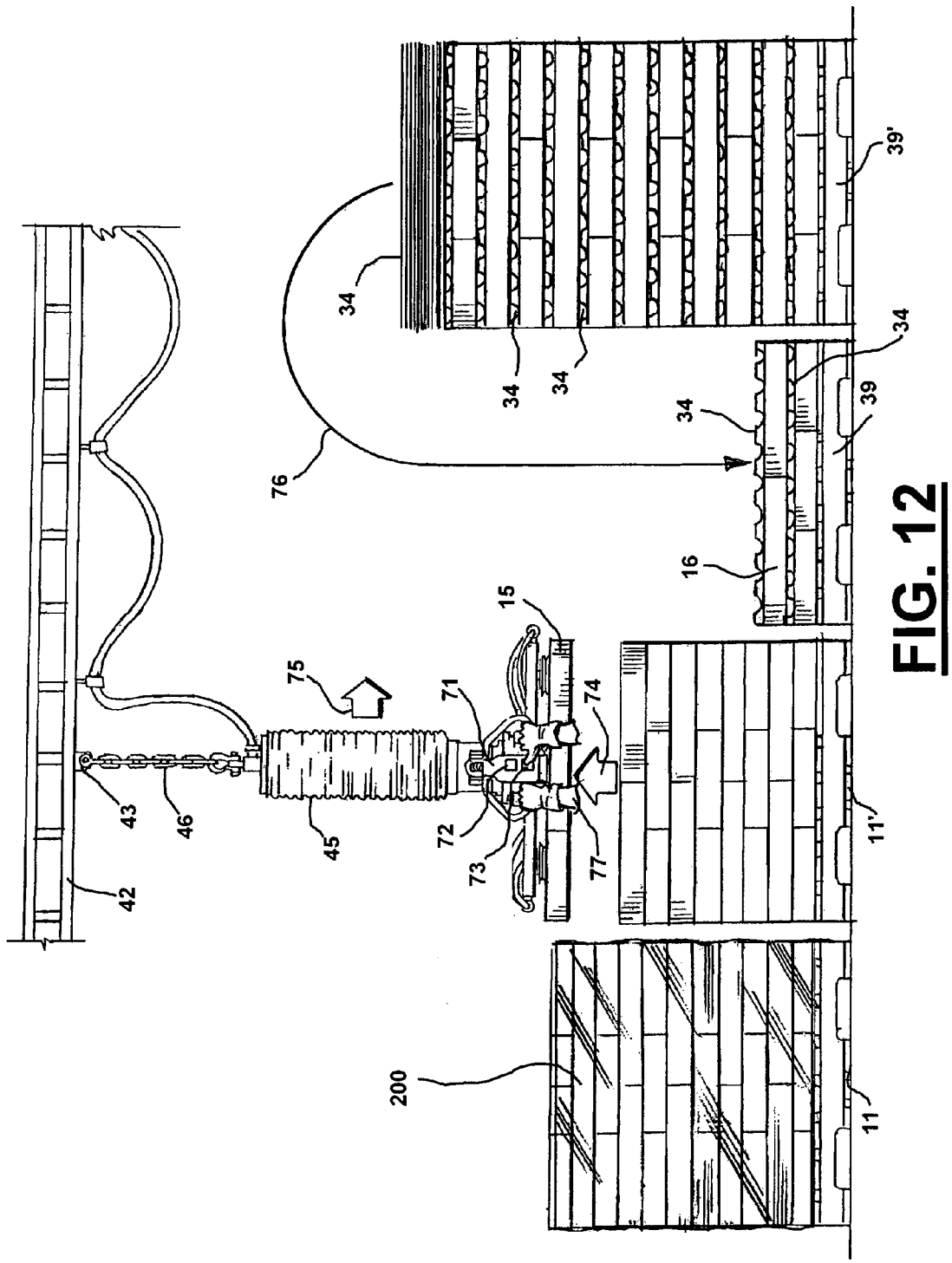
FIG. 12 is a fragmentary side view showing a layer of cartons being lifted by the vacuum assisted lift apparatus of FIG. 7 to be placed on a second pallet where an air circulation divider was previously placed.

In FIGS. 11-13, a steps of one embodiment are shown. Vacuum assist lifting device 40 can be used to lift and then deposit on a spacer 34 an entire layer of cartons (layer 15 is shown being lifted and deposited). Control section 49 has handle 54 having a control panel 71 with input keys 72, 73. One of the input keys 72, 73 can be actuated by operator 77 and thereby used to apply vacuum to the suction cups 56-69 for lifting a selected layer 15 or 24 from a palletized load 11. When vacuum is applied to bellows 45, the bellows continues to contract (see FIG. 11) and thus lift its load (e.g. a layer 15-17 or 24-26). In FIG. 12, arrow 74 schematically illustrates the lifting of a layer 15 and its cartons 18-22 from palletized load 11. Notice that the hands of an operator 77 grip the control handles 54 enabling the operator 77 to operate either of the input keys 72 or 73.

Arrow 75 in FIG. 12 indicate schematically the transport of vacuum assist lifting device 40 from a position above palletized load 11 (after lifting a layer 15) to a position above transfer pallet 39 which can begin as an empty pallet. Transfer pallet 39 contains layers 15, 16, 17 or 24, 25, 26 of food cartons that have been re-stacked with a divider 34 placed in between each pair of layers of food cartons as illustrated schematically by arrow 76 in FIG. 12. In FIG. 11, a second operator 78 is shown holding secondary control handle 55 which can be attached to fitting 53 or to frame 52. Second operator 78 can both assist in lifting up the layer and controlling the lifted layer's position until deposited on spacer or divider 34.

One of the operators 77 or 78 can manually place spacer or divider 34 on top of the stack on the transfer pallet 39 before the new layer is placed on top transfer pallet 39. In FIG. 12 arrow 76 schematically indicates the manual placement of the spacer or divider. This manual placement of the spacer or divider on top of the transfer pallet 39 can be performed before each new layer is placed on top of the spacer. However, no spacer need be placed on top of the transfer pallet 39 itself because the gaps between the slats on top of the transfer pallet can themselves allow cold air to contact the bottom of the first layer placed on top of the transfer pallet 39. Alternatively a spacer could be provided immediately on top.

As shown in FIG. 12 a stack of spacers or dividers 34 can be placed on the most recently completed spaced apart layers of cartons. The stack of spacers or dividers are shown placed on top of spaced apart layers of cartons on transfer pallet 39'. When transfer pallet 39 has been completed stacked with spaced apart layers of cartons, the stack of spacers or dividers 34 can be placed on top of the spaced apart layers of cartons ton transfer pallet 39. Then the entire transfer process would begin again with layers of cartons being transferred from pallet 11 to pallet 11'. After the stack of spacers or dividers 34 are moved from pallet 39' to pallet 39, a lift truck or fork lift can pick up the spaced apart layers of cartons on transfer pallet 39' and bring this stack to a blast freezer for blast freezing.

In an alternative embodiment the stack of spacers or dividers are not placed on the most recently completed pallet of spaced apart layers of cartons, but can be placed somewhere else. For example, in FIG. 12 there could be a gap between pallet 39 and pallet 39' where the stack of spacers or dividers 34 could be placed. By not placing the stack of spacers or dividers on the most recently completed pallet of spaced apart layers, the most recently completed pallet could be brought to the blast freezer a little more quickly (theoretically the time is would take to complete the next pallet of spaced apart layers of cartons. However, placing the stack of spacers or dividers on the floor or some place other than the most recently completed pallet of spaced apart layers of cartons would increase the overall size of the work area by at least the size of the stack of spacers or dividers 34.

Alternatively, spacers or dividers 34 can be placed between every two layers of cartons. However, this is not preferred as cold air would not be able to contact the surfaces of the cartons which touch each other (i.e., in the middle of the two layers) and is believed to substantially slow down the time of blast freezing.

In one embodiment, to increase the overall speed of transfer, operator 77 can manipulate vacuum assist lift device 40 at the same time as operator 78 places spacer or diver 34 on top of the stack on transfer pallet 39. After placing spacer or divider, operator 78 then assists operator 77 in the completion of the handling of vacuum assist lift device 40 in the step of transferring the layer of cartons to transfer pallet 39 (which transfer step was begun during the time operator 78 was placing spacer or divider 34 on transfer pallet 39).

In one embodiment only operator 77 is provided for the transfer. In this case operator 77 would also have to place the spacer or divider 34 before the transfer of each layer of cartons. Using only one operator 77 is expected to slow down the overall transfer process compared to using to operators. Additionally, not as much control over vacuum assist lift device 40 may be had. Additionally, the second operator can watch out for and catch individual cartons which may fall off or sag from the individual suction cups during the transfer process.

As shown in FIG. 12, shrink wrap 200 can be found on a non-spaced apart palletized stack of cartons. Shrink wrap 200 is typically applied to assist in handling the palletized stack of cartons from one location to the next (such as by lift trucks or forklifts). Without the shrink wrap 200, the individual cartons or whole layers could slide or fall off of the palletized stack. However, before the transfer of each layer is performed the shrink wrap should be removed. At the end of the blast freezing process, and after removal of the spacers or dividers 34 from the now frozen layers of cartons, shrink wrap 200' can again be applied to the palletized stacks to assist in movement of the palletized stacks from one location to another without the cartons falling off the pallets.

In FIG. 13, arrow 79 schematically illustrates a release of a layer 16 upon a divider 34 which had been previously placed upon a layer of food cartons in FIG. 12. In FIG. 13, the operator 77 is shown depressing an input key 72 or 73 that releases the layer 76 by releasing the vacuum through suctions cups 59-69. In FIG. 13, the numeral 80 designates generally a palletized load that has been comprised of alternating layers 15-17 or 24-26 of food cartons with spacers or dividers 34 between each pair of layers stacked upon transfer pallet 39'. Additional spacers or dividers 34 are shown stacked upon the top of the palletized load 80.

In one embodiment a plurality of transfer stations using a plurality of vacuum assist lift devices 40, 40' are operated adjacent to each other. FIGS. 14-22 illustrate further another embodiment of the method and apparatus.

In FIG. 14, a pair of transfer vehicles 79, 81 (e.g., lift trucks, fork lifts, or other lifting devices for use in connection with pallets). In FIG. 14, a plurality of rows 82, 83, 84, 85 of stacks of layers of cartons are shown (some already spaced apart, and some waiting to be spaced apart).

Each row 82-85 includes palletized layers of cartons. For two or more rows 82 and 83, a lifting device 40 is provided for removing layers of cartons 15, 16, 17 or 24, 25, 26 from the stacked pallet (using the steps shown in FIGS. 11-13). Lifting device 40 then re-stacks each layer 15-17 or 24-26 upon a transfer pallet 39. To begin, the transfer pallet 39 is preferably an empty pallet as shown in FIG. 14. The process of transfer can be the same as described in FIGS. 11-13.

However, a second vacuum assist lift device 40 with one or two operators can also be provided to transfer another set of non-spaced apart layers of cartons. In this way with the same superstructure 41, multiple sets of layers of cartons can be simultaneously transferred to a spaced apart condition thereby shortening the overall time in spacing apart all the palletized layers of cartons for blast freezing. In FIG. 14 the transfer team using vacuum assist lift device 40 can move in the direction of arrow 300 when transferring pallets in row 82, then turn in the direction of arrow 310 to start transferring pallets in row 83 in the direction of arrow 310. Similarly, the transfer team using vacuum assist lift device 40' can move in the direction of arrow 400 when transferring pallets in row 85, then turn in the direction of arrow 410 to start transferring pallets in row 84 in the direction of arrow 420. Arrows 500, 504 and 510, 514 schematically indicate the ability of vacuum assist lift devices 40, 40' to move in such directions.

After a pallet of spaced apart layers of cartons is completed, it can be picked up by a lift truck or fork lift and brought to the blast freezer. Picking up such finished pallet leaves a space in which a new non-spaced apart pallet can be placed for future transfer to a spaced apart condition. For example, in FIG. 14, after the team using vacuum assist lift device 40 moves in the direction of arrow 320 and completes the transfer of row 83 (finishing with pallet 83'), this teach can turn around again (in the opposite direction of arrow 320) and start transferring a new row 82. This assumes that new pallets non-spaced apart cartons were placed in row 82 by a fork lift or lift truck or other moving device, such as during the time the team was working on row 83.

Alternatively, transfer team working vacuum assist lift device 40 could work all rows 82, 83, 84, and 85, such as by snaking up and down such rows with lift device 40.

Figure 15:
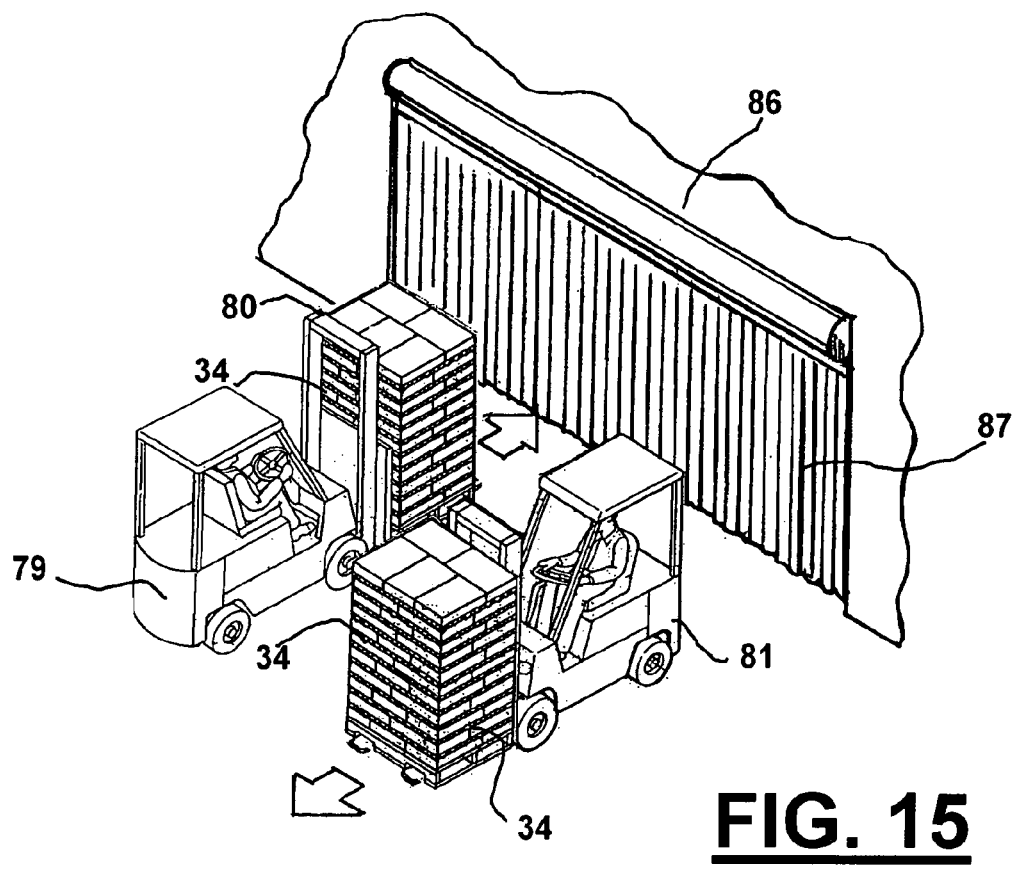
FIG. 15 is a perspective view illustrating the step of method a palletized stack of cartons which have been spaced apart into a blast freezer, along with the step of removing a now frozen palletized stack of spaced apart layers of cartons so that the spacers can be removed from the stack.
Figure 16:
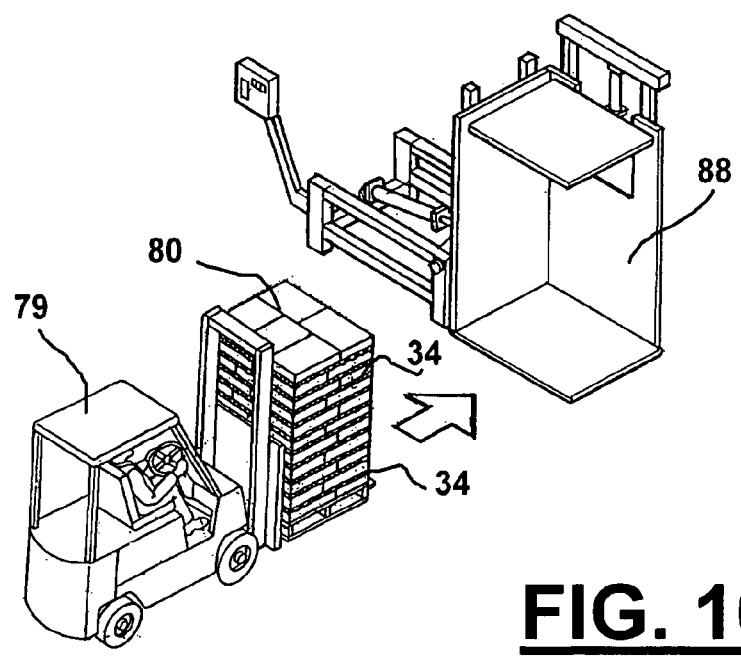
FIG. 16 is a perspective view illustrating the step of placing the palletized stack of spaced apart layers of cartons into a rotator.
Figure 17:
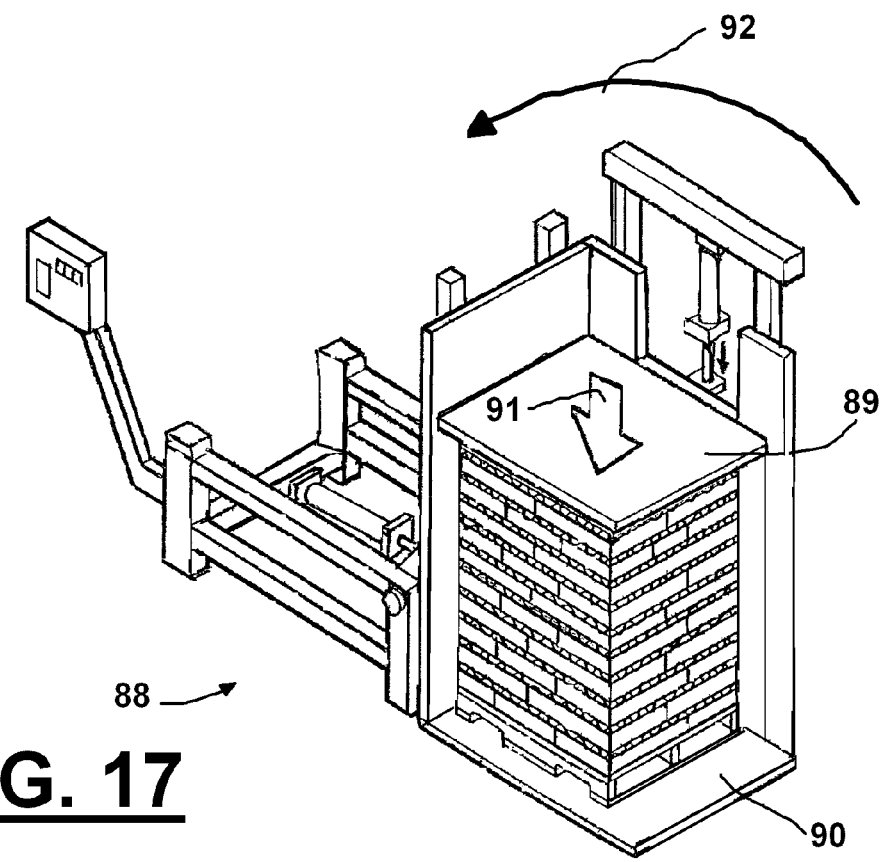
FIG. 17 is a perspective view illustrating the step of stabilizing the palletized stack of spaced apart layers of cartons before rotation.
Figure 18:
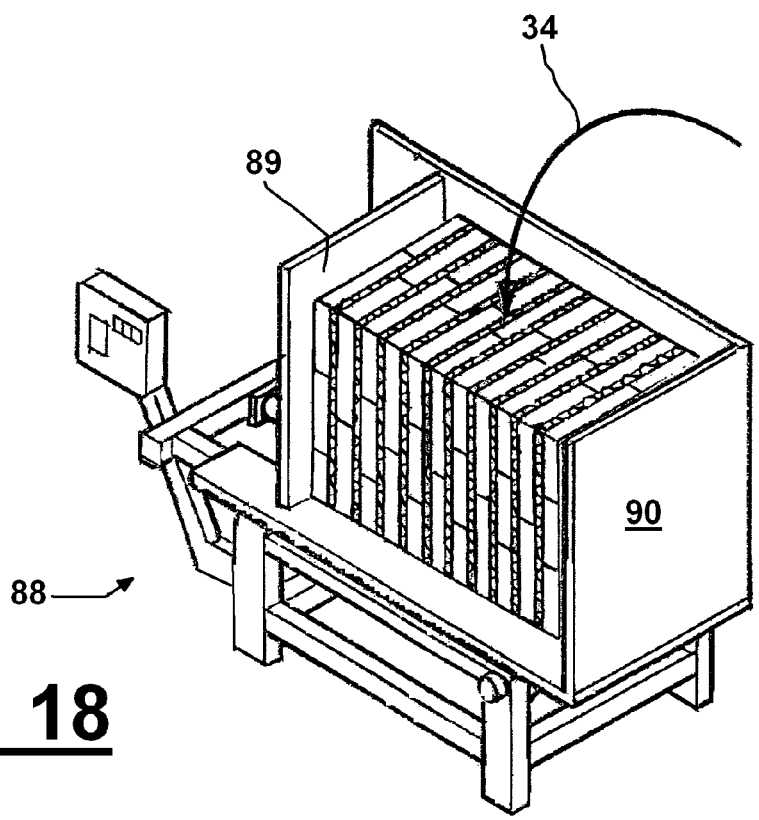
FIG. 18 is a perspective view showing the palletized stack of spaced apart layers of cartons after a ninety degree rotation.
Figure 19:
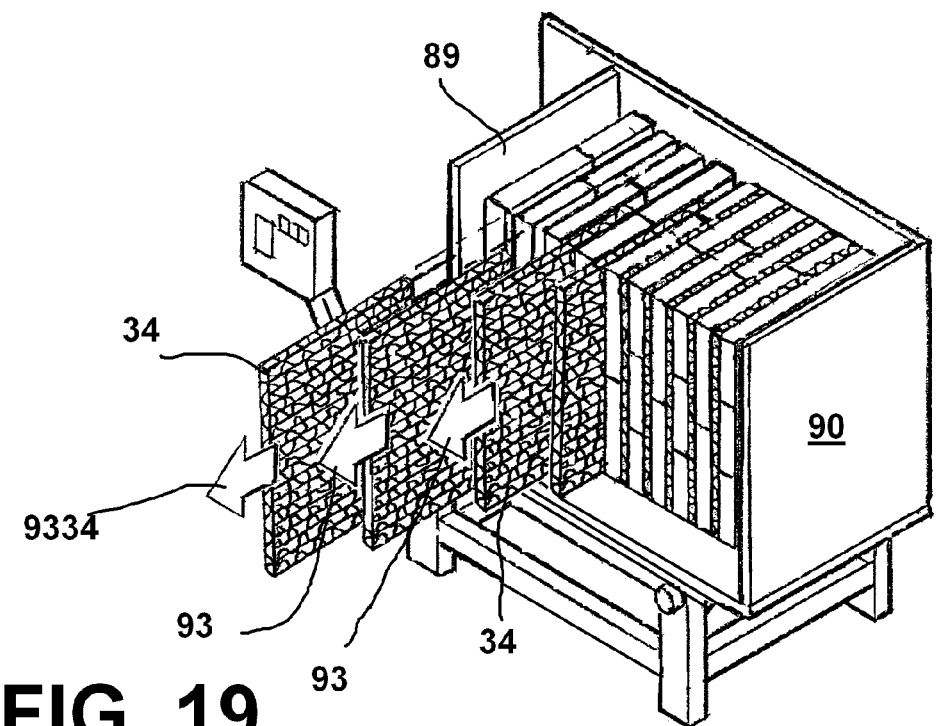
FIG. 19 is a perspective view illustrating the step of removing the spacers from in between the layers.
Figure 20:
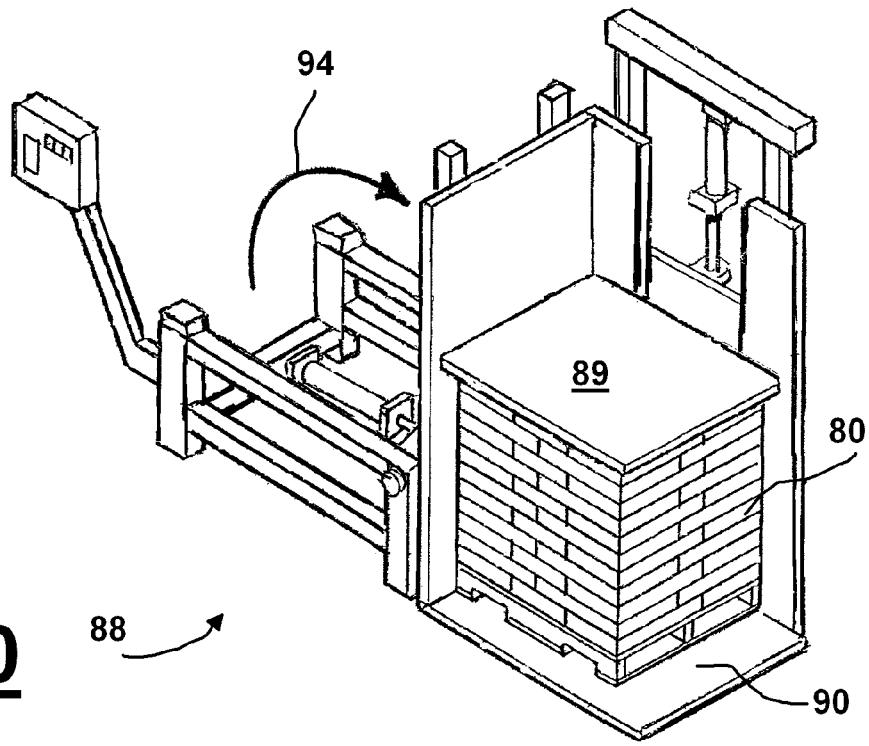
FIG. 20 is a perspective view illustrating the step of rotating the palletized stack of apart layers of cartons which are no longer spaced apart (because the spacers were removed)

In FIGS. 14-16, the forklift vehicle 79-81 picks up a palletized load 80 that has been re-stacked with spacers or dividers 34 between each pair of layers 15-17 or 24-26. The lift truck or forklift 79 or 81 then removes that palletized load 80 and transfers it to blast freezer 86 via blast freezer door 87. In FIG. 15 the door 87 to blast freezer 86 is shown being large enough to accommodate two lift trucks or fork lifts 79 and 81. However, it is preferred that the door 87 be sized to accommodate only one—as the smaller the size of the door 87, the smaller amount of cold air from blast freezer 86 being lost each time the door 87 is opened.

The spaced apart layers of cartons on pallets 80 are frozen in blast freezer 86. After being frozen the spacers or dividers can be removed. The load 80 is then placed upon a commercially available rotator rack 88 and held in compression between plates 89, 90 (see FIG. 17). Compression can be applied as indicated by arrow 91. The rack 88 can then be rotated from a generally vertical position of FIG. 17 to a generally horizontal position of FIG. 18 as indicated schematically by arrow 92. In the generally horizontal position of FIGS. 18 and 19, the air flow dividers 34 can be removed as illustrated by arrows 93 in FIG. 19. Once the dividers 34 have been removed, the now blast frozen cartons contained in layers 15-17 or 24-26 can be returned to an upright generally vertical position on their pallet (shown in FIG. 20) as indicated schematically by arrow 94.

Figure 21:
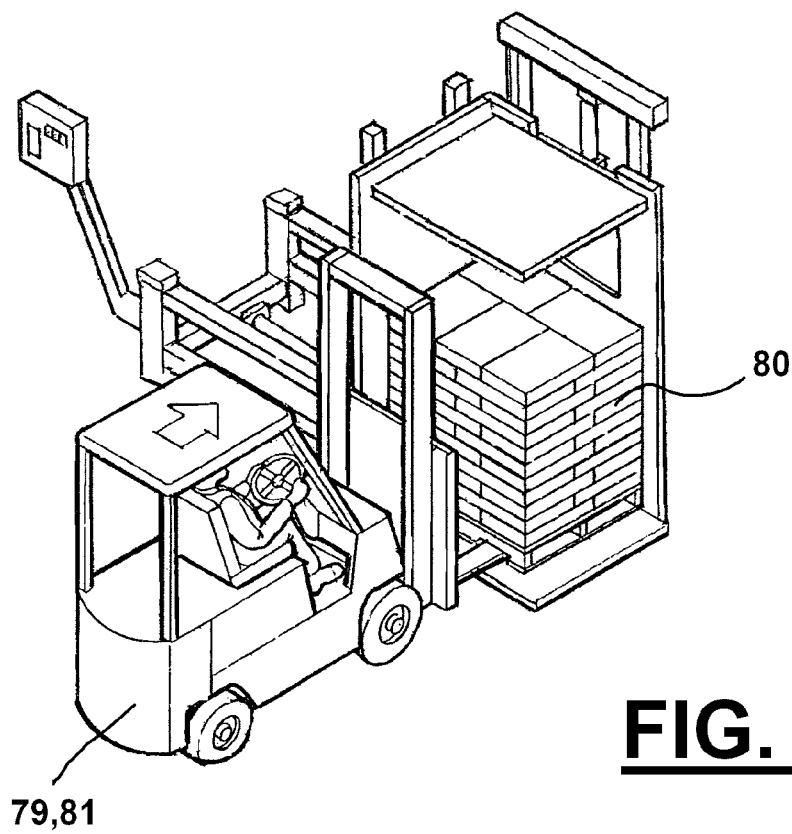
FIG. 21 is a perspective view illustrating the step of removing the palletized stack of cartons from the rotator.
Figure 22:
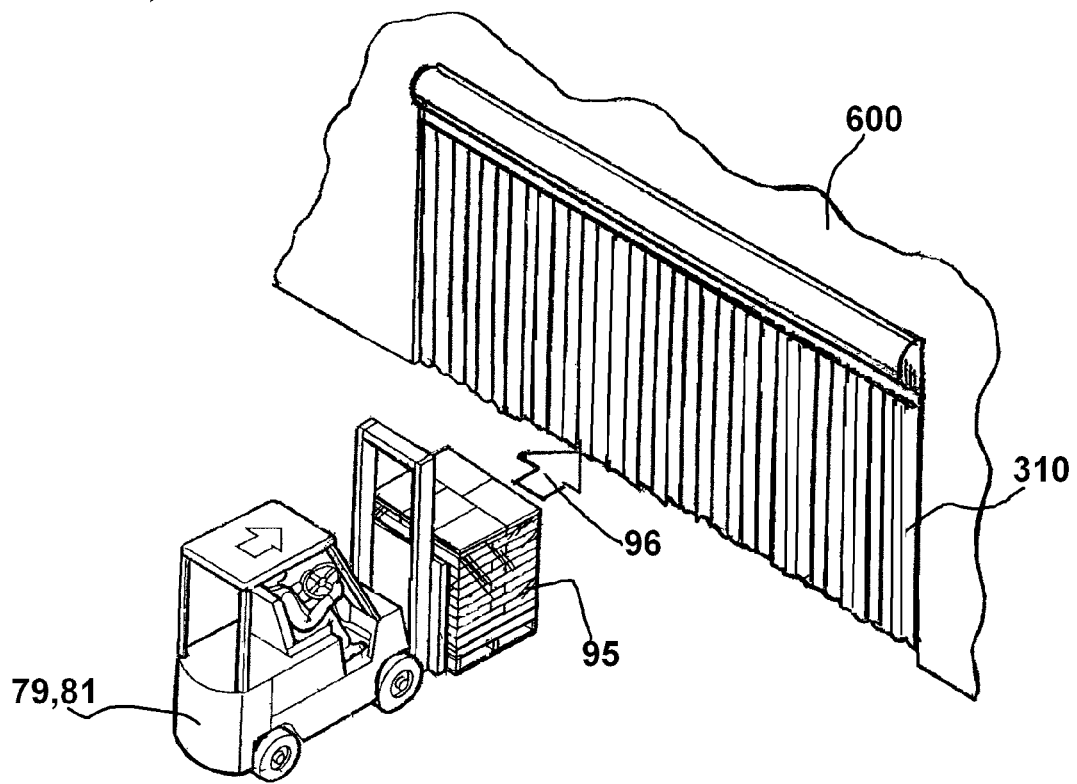
FIG. 22 is a perspective illustrating the step of placing the palletized stack of cartons in a freezer which may be another freezer or the original blast freezer.

In FIGS. 21 and 22, the now blast frozen palletized load of cartons 80 can be removed using lift truck, forklift, or other transfer vehicle 79 or 81, and covered with shrink wrap 95, then placed in a cold storage area such as in freezer 600. Freezer 600 can be different from blast freezer 86.

When desired, the frozen palletized load of cartons in freezer 600 can be moved to a final loading area for loading on a refrigerated ship or vessel for future transport.

Alternatively, the transfer of original stacks of non-frozen layers of animal parts (to install spacers or dividers 34), along with the subsequent rotation of the now blast frozen palletized and spaced apart layers of cartons (to remove the spacers or dividers) can be performed in freezer 600.

Also alternatively, immediately after removal of spacers or dividers 34, the frozen palletized load of cartons can be moved to a final loading area for loading on a refrigerated ship or vessel for future transport.

The following is a list of reference numerals used in this application.

LIST OF REFERENCE NUMERALS

| Reference Number | Description |
|---|---|
| 10 | blast freezing system |
| 11 | stacked pallet/palletized load |
| 12 | first pallet |
| 13 | forklift socket |
| 14 | forklift socket |
| 15 | upper layer of food cartons |
| 16 | middle layer of food cartons |
| 17 | lower layer of food cartons |
| 18 | food carton |
| 19 | food carton |
| 20 | food carton |
| 21 | food carton |
| 21A | closure strip |
| 21B | closure strip |
| 22 | food carton |
| 23 | stacked pallet |
| 24 | upper layer of food cartons |
| 25 | middle layer of food cartons |
| 26 | lower layer of food cartons |
| 27 | food carton |
| 28 | food carton |
| 29 | food carton |
| 29A | closure strip |
| 29B | closure strip |
| 30 | food carton |
| 31 | food carton |
| 32 | food carton |
| 33 | food carton |
| 34 | air circulating divider |
| 35 | air circulating opening |
| 36 | air circulating channel |
| 37 | projection |
| 38 | depression |
| 39 | transfer pallet |
| 40 | vacuum assist lifting device |
| 41 | superstructure/elevated frame |
| 42 | rail |
| 43 | carriage |
| 44 | roller |
| 45 | bellows |
| 46 | tensile member |
| 47 | fitting |
| 48 | vacuum source |
| 49 | control section |
| 50 | upper end |
| 51 | lower end |
| 52 | frame |
| 53 | fitting |
| 54 | primary control handle |
| 55 | secondary control handle |
| 56 | suction cup |
| 57 | suction cup |
| 58 | suction cup |
| 59 | suction cup |
| 60 | suction cup |
| 61 | suction cup |
| 62 | suction cup |
| 63 | suction cup |
| 64 | suction cup |
| 65 | suction cup |
| 66 | suction cup |
| 67 | suction cup |
| 68 | suction cup |
| 69 | suction cup |

LIST OF REFERENCE NUMERALS -continued

| Reference Number | Description |
|---|---|
| 70 | vacuum line |
| 71 | control panel |
| 72 | input key |
| 73 | input key |
| 74 | arrow |
| 75 | arrow |
| 76 | arrow |
| 77 | operator |
| 78 | operator |
| 79 | transfer vehicle |
| 80 | palletized load |
| 81 | transfer vehicle |
| 82 | row of palletized load |
| 83 | row of palletized load |
| 84 | row of palletized load |
| 85 | row of palletized load |
| 86 | blast freezer |
| 87 | door |
| 88 | rack |
| 89 | plate |
| 90 | plate |
| 91 | arrow |
| 92 | arrow |
| 93 | arrow |
| 94 | arrow |
| 95 | shrink wrap layer |
| 96 | arrow |
| 150 | center bars |
| 152 | arm |
| 154 | arm |
| 156 | arm |
| 170 | arrows |
| 172 | arrows |
| 174 | arrows |
| 200 | shrink wrap |
| 300 | arrow |
| 310 | arrow |
| 320 | arrow |
| 400 | arrow |
| 410 | arrow |
| 420 | arrow |
| 500 | arrows |
| 504 | arrows |
| 510 | arrows |
| 514 | arrows |
| 600 | freezer |
| 610 | door for freezer |

All measurements disclosed herein are at standard temperature and pressure, at sea level on Earth, unless indicated otherwise. All materials used or intended to be used in a human being are biocompatible, unless indicated otherwise.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. A method of loading food cartons for blast freezing, comprising the steps of:
a) stacking multiple loaded pallets in multiple rows, multiple loaded pallets wherein each of the pallets is loaded with multiple layers of the food cartons to be frozen by blast freezing, each of the loaded pallets including multiple layers, wherein each of the layers having multiple food cartons;
b) providing a first vacuum assist lifting device having multiple suction cups;
c) using the first vacuum assist lifting device to lift one of the layers of cartons from a first pallet from a first row of pallets of step "a", one layer at a time, wherein one or more suction cups of the first vacuum assist lifting device engage the layer of the cartons;
d) after step "c", placing the first layer on a second pallet of the first row of pallets of step "a" to be blast frozen;
e) after step "d", placing a divider on the first layer of the second pallet of the first row of pallets of step "a";
f) after step "e", sequentially transferring each of the layers from the first pallet of the first row of pallets of step "a" to the second pallet of the first row of pallets of step "a"; and
g) placing a divider in between each pair of the layers in step "f"
h) after step "g", moving the first vacuum assist lifting device from the first row of pallets of step "a" to a second row of pallets of step "a", and using the first vacuum assist lifting device to lift the layer of the cartons from a first pallet of the second row of pallets of step "a" to a second pallet of the second row of pallets of step "a", one layer at a time, wherein one or more suction cups of the first vacuum assist lifting device engage the layer of the cartons.

2. The method of claim 1, wherein in step "e" the first vacuum lifting device is simultaneously transferred to a second layer of cartons on the first pallet of the first row of pallets of step "a".

3. The method of claim 1, wherein in steps "c" and "d" two workers stabilize the lifting device.

4. The method of claim 1, wherein in step "e" one of the workers places the divider on the first layer and a second of the workers returns the lifting device to the first pallet of cartons on the first row of pallets of step "a".

5. The method of claim 1, further comprising the steps of:
i) providing a second vacuum assist lifting device having multiple suction cups;
j) during step "c" using the second vacuum assist lifting device to lift a layer of cartons from a first pallet from a third row of pallets of step "a", one layer at a time, wherein one or more suction cups of the second vacuum assist lifting device engage the layer of the cartons;
k) after step "j", placing the first layer on a second pallet of the third row of pallets of step "a" to be blast frozen;
l) after step "k", placing a divider on the first layer of the second pallet of the third row of pallets of step "a";
m) after step "l", sequentially transferring each of the layers from the first pallet of the third row of pallets of step "a" to the second pallet of the third row of pallets of step "a"; and
n) placing a divider in between each pair of the layers in step "m"
o) after step "n", moving the second vacuum assist lifting device from the third row of pallets of step "a" to a fourth row of pallets of step "a", and using the second vacuum assist lifting device to lift the layer of cartons from a first pallet of the fourth row of pallets of step "a" to a second pallet of the fourth row of pallets of step "a", one layer at a time, wherein one or more suction cups of the second vacuum assist lifting device engage the layer of the cartons.

6. The method of claim 1 wherein in moving from the first vacuum assist lifting device between the first row and the second row, the first vacuum assist lifting device moves in a direction which is substantially perpendicular to the direction when moving along the first row and when moving along the second row.

7. The method of claim 1, wherein the first vacuum lifting device has multiple suction cups mounted to a frame, at least one of the suction cups being adjustable in its position relative to others of the suction cups.

8. The method of claim 1, wherein the first vacuum assist lifting device has a first handle that is operable by a first worker and a second handle, the first handle having a control that enables the amount of vacuum applied to the layer to be varied.

9. The method of claim 1, wherein the vacuum assist lifting device has a control that enables one of the layers of cartons to be released for depositing the layer of cartons on the second pallet.

10. The method of claim 1, wherein the second pallet is transferred to a blast freezer after steps "e" and "f".

11. A method of loading food cartons for blast freezing, comprising the steps of:
a) stacking multiple loaded pallets in multiple rows, multiple loaded pallets wherein each of the pallets is loaded with multiple layers of food cartons to be frozen by blast freezing, each of the loaded pallets including multiple layers, each of the layers having multiple food cartons;
b) providing two or more self propelled vehicles that enable a transfer of at least one transfer pallet from an area next to the multiple rows to a blast freezer;
c) placing an air flow divider between the layers of food cartons for each of the transfer pallets that is transferred to the blast freezer; and
d) providing first and second vacuum assist lifting devices, wherein in steps "a"-"c" further comprising:
(i) the first vacuum assist lifting device lifts the layer of cartons from a first pallet from a first row of pallets of step "a", one layer at a time, moving to a second pallet of the first row of pallets of step "a", and continuing until sequentially transferring each of the layers from the first pallet of the first row of pallets of step "a" to the second pallet of the first row of pallets of step "a"; and moving the first vacuum assist lifting device from the first row of pallets of step "a" to a second row of pallets of step "a", and using the first vacuum assist lifting device to lift the layer of cartons from a first pallet of the second row of pallets of step "a" to a second pallet of the second row of pallets of step "a", one layer at a time;
(ii) the second vacuum assist lifting device lifting the layer of cartons from a first pallet from a third row of pallets of step "a", one layer at a time, moving to a second pallet of the third row of pallets of step "a", and continuing until sequentially transferring each of the layers from the first pallet of the third row of pallets of step "a" to the second pallet of the third row of pallets of step "a"; and moving the second vacuum assist lifting device from the third row of pallets of step "a" to a fourth row of pallets of step "a", and using the second vacuum assist lifting device to lift the layer of cartons from a first pallet of the fourth row of pallets of step "a" to a second pallet of the fourth row of pallets of step "a", one layer at a time; and
e) wherein in steps "a"-"c" each of the lifting devices stacks a layer removed in step "d" to the transfer pallet.

12. The method of claim 11, wherein each of the layers is transferred from a loaded pallet to a transfer pallet that initially is an empty pallet.

13. The method of claim 12, wherein the air flow divider is placed in between each pair of the layers of food cartons of the transfer pallet.

14. The method of claim 13, wherein a vehicle transports one of the transfer pallets to the blast freezer after step "e".

15. The method of claim 13, wherein an air flow divider is placed on each of the layers of cartons placed on the transfer pallet.

16. The method of claim 11, wherein in moving from the first vacuum assist lift device from the first row to the second row, the first vacuum assist lifting device moves in a direction which is substantially perpendicular to the direction when moving along the first row and when moving along the second row, and when moving the second vacuum assist lift device from the third row to the fourth row the second vacuum assist lifting device moves in a direction which is substantially perpendicular to the direction when moving the second vacuum assist lift device along the third row and along the fourth row.

* * * * *